Patented Oct. 23, 1928.

1,688,757

UNITED STATES PATENT OFFICE.

WINFIELD SCOTT, OF AKRON, OHIO, ASSIGNOR TO THE RUBBER SERVICE LABORATORIES COMPANY, OF AKRON, OHIO, A CORPORATION OF OHIO.

PROCESS OF MANUFACTURING VULCANIZED RUBBER AND PRODUCT THEREOF.

No Drawing.      Application filed April 8, 1927. Serial No. 182,187.

The present invention relates to the process of manufacturing a vulcanized rubber product by employing a dissimilar-aryl di-substituted-guanidine as an accelerator of that process. The invention will be understood from the following description and examples wherein the invention is fully set forth and described.

Di-phenyl-guanidine and other similarly constituted guanidines have heretofore been described as rubber vulcanization accelerators. I have found, however, that as a class, all symmetrical and dissimilar-aryl di-substituted-guanidines are not accelerators of the vulcanization process, and furthermore that many of the compounds of this class that do accelerate the process mentioned, are not sufficiently active as to be commercially practicable for use in this process.

The nature and type of the radical introduced into the guanidine nucleus generally has a profound effect upon the vulcanization accelerating properties of the resulting compound. Many of the di-substituted-guanidines are non-accelerators, some are faster in their action in a rubber sulphur mix than is di-phenyl-guanidine, several are substantially the same in accelerating power, and others have their accelerating value so impaired as to be not at all practicable for use from an accelerating standpoint.

One dissimilar-aryl substituted di-phenyl-guanidine which I have manufactured and the properties of which I have investigated as an accelerator of the rubber vulcanization process is p-di-methyl-amino-di-phenyl-guanidine. This compound has been prepared for use in the examples as are hereinafter set forth by reacting phenyl-mustard oil with p-amino-di-methyl-aniline to produce a thiourea and then desulphurizing the thiourea so formed.

The thiourea desired was preferably prepared by reacting 135 parts (1 molecular proportion) of phenyl mustard oil with approximately 136 parts by weight (1 molecular proportion) of p-amino-di-methyl-aniline. The reaction that takes place is most conveniently represented as follows:

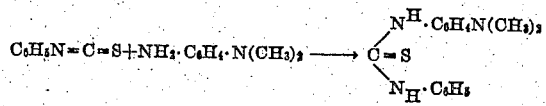

The thiourea so obtained was then desulphurized by treatment with a lead compound while warming under pressure in the presence of ammonia. Preferably the ammonia was used in the form of an alcoholic solution thereof. The heating of the mass was continued for a period of time necessary to produce substantially complete combination of the substances whereupon the mixture was allowed to cool, any excess of pressure was released, and the reaction product was filtered. The residuum was then washed with a diluted acid such as hydrochloric acid to dissolve any guanidine derivative from unchanged thiourea which may remain in the product. The acid solution was then rendered slightly alkaline by the addition thereto of a suitable alkali, such as caustic soda and the precipitated guanidine derivative was then filtered and washed and combined with the product obtained from the alcoholic liquor. The product can be further purified, if necessary, by redissolving it again in an acid and precipitating as before with caustic. The resulting product, p-di-methyl-amino-di-phenyl-guanidine, has a composition represented by the following formula:

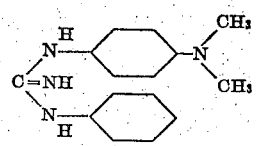

The product produced as described above has been employed as an accelerator in the vulcanization of rubber in a composition comprising 100   parts smoked sheet rubber,
  5   parts zinc oxide,
  3.5 parts sulphur,
  0.5 parts p-di-methyl-amino-di-phenyl-guanidine.

Such a rubber compound was manufactured in the usual manner and portions of the composition were then heated for varying times in a press under the temperature given by forty pounds of steam pressure per square inch. The resulting products were then tested and their physical characteristics determined with the following results:

| Time of cure | Modulus of elasticity at elongation of— | | | Tensile strength at break in lbs./in.² | Ultimate elongation |
|---|---|---|---|---|---|
| | 300% | 500% | 700% | | |
| 15 min. at 287° F | 146 | 293 | 1004 | 2430 | 835% |
| 30 min. at 287° F | 210 | 478 | 1970 | 3100 | 785% |
| 45 min. at 287° F | 245 | 549 | 2335 | 3185 | 745% |
| 60 min. at 287° F | 295 | 734 | 3130 | 4050 | 755% |

The above compound, comprising a so-called pure gum stock was vulcanized to a commercial cure after heating under the conditions set forth for from 45 to 60 minutes.

An accelerator comprising the subject matter of the present invention has also been employed as an ingredient in a composition for use as a tread stock. Such a stock comprised:

31 parts smoked sheet rubber,
20 parts No. 2 amber crepe rubber,
20.5 parts zinc oxide,
19 parts carbon black,
3.5 parts mineral rubber,
1 part of a blended mineral and vegetable oil,
2 parts sulphur,
0.5 parts p-di-methyl-amino-di-phenyl-guanidine.

The above stock was prepared in the usual manner and portions of the composition were vulcanized by heating for different periods of time in a press maintained at the temperature given by forty pounds of steam pressure per square inch. These products were then tested and the following results were obtained:

| Time of cure | Modulus of elasticity at elongation of— | | Tensile strength at break | Ultimate elongation |
|---|---|---|---|---|
| | 300% | 500% | | |
| 45 min. at 287° F | 1017 | 2570 | 3500 | 630% |
| 60 min. at 287° F | 1228 | 3011 | 3735 | 605% |
| 90 min. at 287° F | 1530 | 3340 | 3670 | 545% |

The best cure for the stock prepared was found to result after from 45 to 60 minutes heating under the conditions set forth.

A cushion stock was also prepared by compounding in the usual manner a rubber mix comprising:

100 parts smoked sheet rubber,
15 parts zinc oxide,
3 parts sulphur,
0.8 part accelerator.

The product was then heated in a press at approximately 287° F. and portions so heated for varying times were tested and the following results obtained:

| Time of cure | Modulus of elasticity at elongation of— | | | Tensile strength at break | Ultimate elongation |
|---|---|---|---|---|---|
| | 300% | 500% | 700% | | |
| 30 min. at 287° F | 310 | 810 | 2840 | 3590 | 800% |
| 45 min. at 287° F | 384 | 1058 | 3480 | 4330 | 775% |
| 60 min. at 287° F | 426 | 1300 | 4090 | 4090 | 700% |

The optimum cure is seen to be that produced after heating for approximately 45 minutes under the conditions set forth.

The accelerator particularly described has also been employed in the manufacture of a hard rubber composition. Such a product comprised:

20 parts No. 2 amber crepe rubber,
20 parts smoked sheet rubber,
5 parts lime,
15 parts zinc oxide,
25 parts sulphur,
10 parts mineral rubber,
2 parts p-di-methyl-amino-di-phenyl-guanidine.

The above composition was found to produce a good hard rubber when vulcanized for about two hours and fifteen minutes in a press maintained at the temperature of approximately 287° F.

The examples hereinbefore given are to be understood as illustrative only and not at all limitative of the scope of my invention. Other means of employing the preferred accelerating compound in rubber compositions, and other means of manufacturing the particular guanidine compound described are apparent to those skilled in the art to which the invention applies. Moreover, my invention is not to be understood as depending upon the accuracy of any theories set forth by way of explanation of the chemical changes involved in the manufacture of the accelerator described. The invention is to be considered as limited solely by the following claims attached hereto as a part of this invention wherein I intend to claim all novelty inherent in my invention as is permissible in view of the prior art.

It is apparent from the foregoing description that the compounds designated as dissimilar-aryl di-substituted guanidines hereinbefore set forth as rubber vulcanization accelerators, preferably comprise guanidine derivatives wherein different aryl groups or substituted aryl groups are substituted in place of two hydrogen atoms linked to two different nitrogen atoms. Such guanidines are of an entirely different type from those obtained by replacing two hydrogen atoms attached to the same nitrogen atom by two dissimilar groups.

What I claim is:

1. The process of manufacturing vulcanized rubber which comprises heating a mixture of rubber and sulphur in the presence of a small proportion of p-di-methyl-amino-di-phenyl-guanidine.

2. A rubber product obtained by heating a mixture of rubber and sulphur in the presence of a small proportion of an accelerator comprising p-di-methyl-amino-di-phenyl-guanidine.

In testimony whereof I affix my signature.

WINFIELD SCOTT.